United States Patent [19]

Okimoto et al.

[11] Patent Number: 4,706,621
[45] Date of Patent: Nov. 17, 1987

[54] INTAKE SYSTEMS FOR ROTARY PISTON ENGINES

[75] Inventors: Haruo Okimoto; Seiji Tashima, both of Hiroshima, Japan

[73] Assignee: Mazda Motor Corporation, Hiroshima, Japan

[21] Appl. No.: 914,158

[22] Filed: Oct. 1, 1986

[30] Foreign Application Priority Data

Oct. 4, 1985 [JP] Japan ................................ 60-222333

[51] Int. Cl.⁴ ............................................. F02B 53/04
[52] U.S. Cl. ..................................... 123/216; 123/242
[58] Field of Search ..................... 123/52 M, 216, 242

[56] References Cited

U.S. PATENT DOCUMENTS 3,491,733  1/1970  Soubis ................................... 123/52
4,562,804  1/1986  Tadokoro et al. ................... 123/216

Primary Examiner—Stephen F. Husar
Attorney, Agent, or Firm—Fleit, Jacobson, Cohn & Price

[57] ABSTRACT

A rotary piston engine having three or more rotors and provided with an intake system including a primary individual intake passage leading to each rotor unit and a secondary individual intake passage leading to each rotor unit for providing a supply of intake charge under a heavy load engine operation. The secondary individual intake passages are connected together by a junction and have passage lengths which are determined such that the pressure wave produced at the intake port for one rotor unit is transmitted to the intake port for another rotor unit after a time interval corresponding to 180° in terms of angle of rotation of the eccentric shaft.

13 Claims, 6 Drawing Figures

INTAKE SYSTEMS FOR ROTARY PISTON ENGINES

BACKGROUND OF THE INVENTION

1. Field of the Invention

The present invention relates to rotary piston engines and more particularly to intake systems for rotary piston engines. More specifically, the present invention pertains to intake systems for rotary piston engines wherein the pressure pulsations produced in one working chamber are transmitted to the intake port for another working chamber to thereby produce a supercharging effect.

2. Description of the Prior Art

In rotary piston engines, it has already been proposed to utilize the pressure pulsations produced at the intake port for obtaining a supercharging effect. For example, the U.S. Pat. No. 3,491,733 discloses a single rotor type rotary piston engine which has an intake system including two intake passages of different lengths so that pressure resonance effect can be obtained at different engine speeds. The concept of obtaining a supercharging effect in the patent is to produce a pressure resonance in the intake passage leading to a single working chamber. When the concept is applied to a multiple rotor type rotary piston engine, the pressure resonance is produced in each one of the individual intake passages leading from the intake manifold to the respective ones of the working chambers. Therefore, the individual intake passages must be of substantial lengths in order that the pressure resonance effect is obtained in a normal operating speed of the engine. Further, there must be provided at least two individual intake passages for each rotor chamber so that the pressure resonance effect is utilized in a wide range of engine speed.

It has been recognized in rotary piston engines having intake ports formed in side housings that there is an overlap between the intake port and the exhaust port in the very beginning of the intake stroke so that there is a noticeable quantity of residual combustion gas in the working chamber and the residual combustion gas produces a compression wave in the intake passage in the vicinity of the intake port in the instance when the intake port is opened. The U.S. Pat. No. 4,562,804 proposes to utilize the pressure wave thus produced in the intake port for one working chamber to supercharge another working chamber. According to the proposal, the opening timing of the intake port and the length of the passage from the intake port for one working chamber to the intake port for another working chamber is properly determined so that the pressure wave produced at the intake port for the one working chamber is transmitted to the intake port for the other working chamber at the final period of the intake stroke of the other working chamber under an engine speed range wherein a high output power is required. The proposal by the U.S. patent is specifically for two rotor type rotary piston engines and the proposed structure is limited to an application for the two rotor type engines.

It has now been found by the inventors that in rotary piston engines having three or more rotors that the pressure waves produced in the intake ports for the respective working chambers influence with each other so that it is not easy to utilize the pressure waves for supercharging. It has also been found by the inventors that under a specific condition it is possible to obtain a useful interaction between the pressure waves so that an effective supercharging can be obtained by utilizing the pressure waves.

SUMMARY OF THE INVENTION

It is therefore an object of the present invention to provide an intake system for a rotary piston engine having three or more rotors which can utilize the pressure waves produced in the intake passages in the vicinity of the intake ports for supercharging.

Another object of the present invention is to provide an intake system for a rotary piston engine having at least three rotors in which the passage length from the intake port for one working chamber to the intake port for another working chamber is determined so that a supercharging effect is obtained under a normal engine operating range.

According to the present invention, the above and other objects can be accomplished by a rotary piston engine comprising a rotor casing which includes at least three rotor housings each having an inner wall surface of a trochoidal configuration, an intermediate housing located between each adjacent two rotor housings and a side housing attached to an outer surface of each outermost rotor housing so that a rotor cavity of trochoidal configuration is defined in each rotor housing, a substantially polygonal rotor disposed in each rotor cavity with apex portions in sliding contact with the inner wall surface of the rotor housing to define working chambers of cyclically variable volumes upon rotation of the rotor, eccentric shaft means carrying said rotors so that the rotors are angularly offset with each other by equal angular distance, intake means including intake port means provided in said casing to open to one working chamber in each rotor housing, individual intake passage means having one end connected with each intake port means, junction means connected with the other ends of the respective individual passage means, said individual intake passage means leading to the respective ones of the intake port means having the same passage length, said individual intake passage means and said junction means having passage lengths which are determined such that a pressure wave produced at one intake port means is transmitted to another intake port means after a time interval corresponding to 180° in terms of angle of rotation of the eccentric shaft means in a normal speed range of engine operation.

The present invention is based on the inventors' findings that in a rotary piston engine having at least three rotors successive openings of the intake ports produces a pressure which changes substantially along a sine curve. Thus, by determining the passage lengths between the intake port means so that the pressure wave produced at one intake port means is transmitted to another intake port means after a time interval corresponding to 180° C. in terms of rotation of the eccentric shaft means in a normal speed range of the engine operation, it is possible to obtain a supercharging effect utilizing the pressure wave.

The above and other objects and features of the present invention will become apparent from the following descriptions of preferred embodiments taking reference to the accompanying drawings.

DESCRIPTION OF THE PREFERRED EMBODIMENTS

Figures 1, 2:
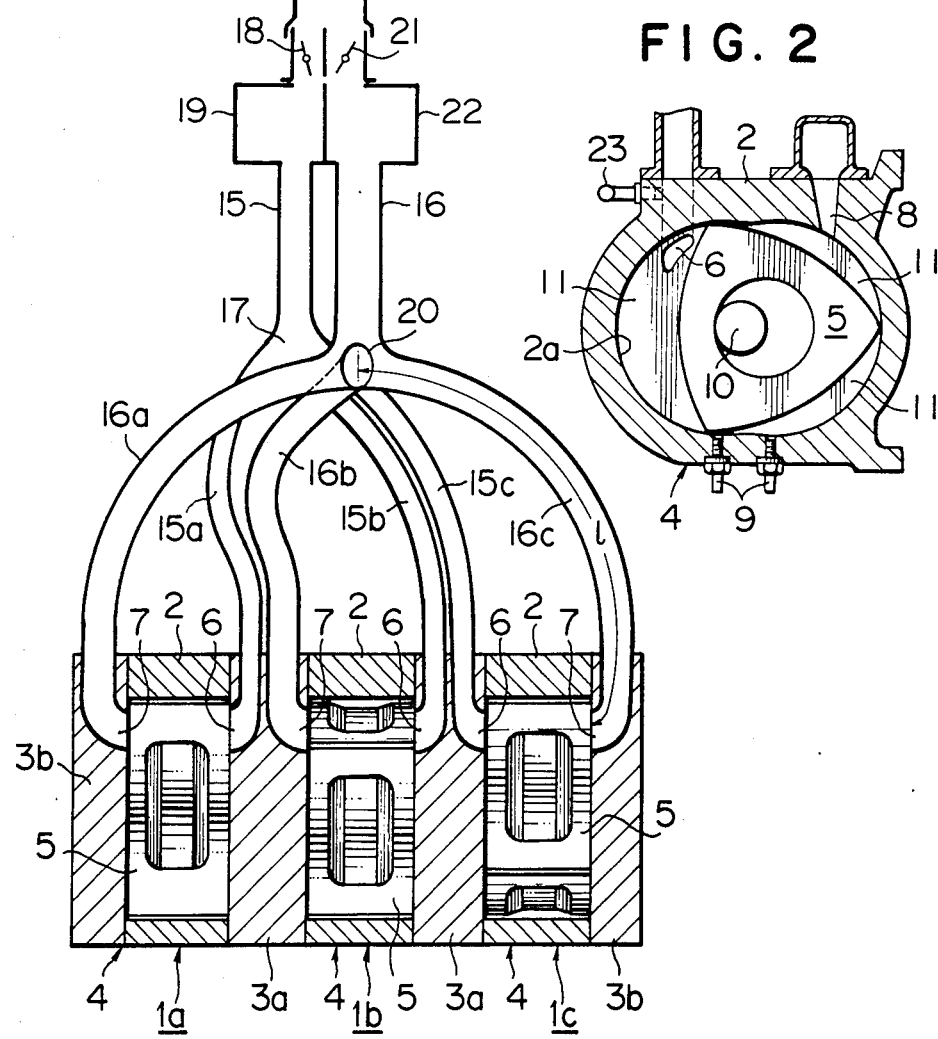
FIG. 1 is a longitudinal sectional view of a three rotor type rotary piston engine having an intake system in FIG. 2 is a cross-sectional view of the rotary piston engine shown in FIG. 1.

Referring to the drawings, particularly to FIGS. 1 and 2, there is shown a three rotor type rotary piston engine including rotor units 1a, 1b and 1c. The rotary piston engine includes a casing 4 which comprises rotor housings 2 each having an inner wall surface 2a of a trochoidal configuration, an intermediate housing 3a located between each two adjacent rotor housings 2 and a side housing 3b attached to the outer side surface of each outer rotor housing 2. Thus, for the rotor units 1a and 1c, rotor cavities are defined by the rotor housings 2, the intermediate housings 3a and the side housings 3b. Similarly, a rotor cavity is defined for the rotor unit 1b by the rotor housing 2 and the intermediate housings 3a. In each of the rotor cavities, there is disposed a rotor 5 of a substantially triangular configuration for rotation with apex portions in sliding contact with the inner wall surface 2a of the rotor housing 2. Thus, there are defined three working chambers 11 in each rotor cavity. The rotors 5 are carried by an eccentric shaft 10 so that the rotors 5 are rotated with a phase difference of 120° in terms of angle of rotation of the eccentric shaft 10.

In FIG. 1, it will be noted that the intermediate housing 3a between the rotor housings 2 for the rotor units 1b and 1c is formed with primary intake ports 6 which open to the rotor cavities for the rotor units 1b and 1c, respectively. The intermediate housing 3a between the rotor housings 2 for the rotor units 1a and 1b is formed with a primary intake port 6 which opens to the rotor cavity for the rotor unit 1a. This intermediate housing 3a is also formed with a secondary intake port 7 which opens to the rotor cavity for the rotor unit 1b. The side housing 3b is formed with a secondary intake port 7 which opens to the rotor cavity for each of the rotor units 1a and 1b. As shown in FIG. 2, the rotor housing 2 is formed with an exhaust port 8. Ignition plugs 9 are mounted on each of the rotor housings 2. The primary intake ports 6 are connected respectively with individual intake passages 15a, 15b and 15c which leads respectively to the intake ports 6 for the rotor units 1a, 1b and 1c. The secondary intake ports 7 are connected with individual intake passages 16a, 16b and 16c which respectively leads to the intake ports 7 for the rotor units 1a, 1b and 1c. A main intake passage 12 is provided and has an air filter 13 and an air flowmeter 14.

The main intake passage 12 is connected through a primary intake passage 15 with the individual intake passages 15a, 15b and 15c which meets at a junction or manifold 17. The primary intake passage 15 is provided with a primary throttle valve 18 and a surge tank 19 which is located downstream of the throttle valve 18. The main intake passage 12 is further connected through a secondary intake passage 16 with the individual intake passages 16a, 16b and 16c which meets at a junction or manifold 20. The secondary intake passage 16 is provided with a secondary throttle valve 21 and a surge tank 22 which is located downstream of the throttle valve 21. The primary throttle valve 18 is manually actuated by an accelerator pedal and the secondary throttle valve 21 starts to open when the primary throttle valve is opened to a predetermined position. It will therefore be understood that the intake charge is drawn through the primary intake ports 6 throughout the engine operation and through the secondary intake ports 7 under an engine load greater than a predetermined value. A fuel injection valve 23 is provided in the individual intake passage in the vicinity of each primary intake port 6.

In the embodiment which is being described, the secondary individual intake passages 16a, 16b and 16c have the same passage length l as measured from each intake port 7 to the junction 20. Further, the passage length L between two intake ports 7, that is, a sum of the length of the individual intake passage to one secondary intake port 7, the length of the individual intake passage to another secondary intake port 7 and the length of the junction 20 connecting these two individual intake passages is determined such that the pressure wave produced at one secondary intake port 7 is transmitted to another secondary intake port 7 after a time interval corresponding to 180° in terms of angle of rotation of the eccentric shaft 10 under a normal speed of engine operation.

The passage lengths can be determined in accordance with the following procedures.

Under an engine speed of N rpm, the time corresponding to 180° rotation of the eccentric shaft 10 is calculated by the following formula.

$$(180/360) \times (60/N)$$

Since the pressure wave propagates at a sonic speed a, the passage length L can be calculated by the following formula.

$$L = (180/360) \times (60/N) \times a \qquad (1)$$

Since the length l of the individual intake passage is substantially one half of the length L, the length can be calculated as follows.

$$l = (180/360) \times (60/N) \times (a/2) \qquad (2)$$

Precisely stating, the length l must be the one which is modified taking the conditions at the ends of the passage, however, the modification factor is usually very small so that the value l can substantially represent the required length of the individual intake passage 16a, 16b or 16c. It will therefore be understood that a satisfactory result can be obtained by determining the lengths l of the individual intake passages 16a, 16b and 16c so that the condition in the formula (2) is met in the engine operating condition wherein a high output power is desired. Generally, a high output is desired under a high speed operation so that the value N may be chosen between 5000 and 8000 rpm. Then, the passage length l becomes 1.04 to 0.65 m assuming that the sonic speed is 346 m/s.

It is preferable to design the secondary individual intake passages to meet the condition described above because the secondary intake passages have greater passage areas than the primary intake passages and the secondary intake ports are closed later than the primary intake ports so that the supercharging effects are more likely to occur in the secondary intake passages than in the primary intake passages. Further, the secondary intake passages are opened under an engine operating condition wherein a high output is desired.

It is of course possible to determine the lengths of the primary individual intake passages 15a, 15b and 15c so that the condition in the formula (2) is met under a normal engine operating range. For example, the primary passage length may be determined so that a supercharging effect is obtained in the same engine speed range as in the secondary passages or in a different engine speed range. In case where the intake system has only one intake passage for each rotor unit, the passage is designed to have the length as determined by the formula (2).

Figure 3:
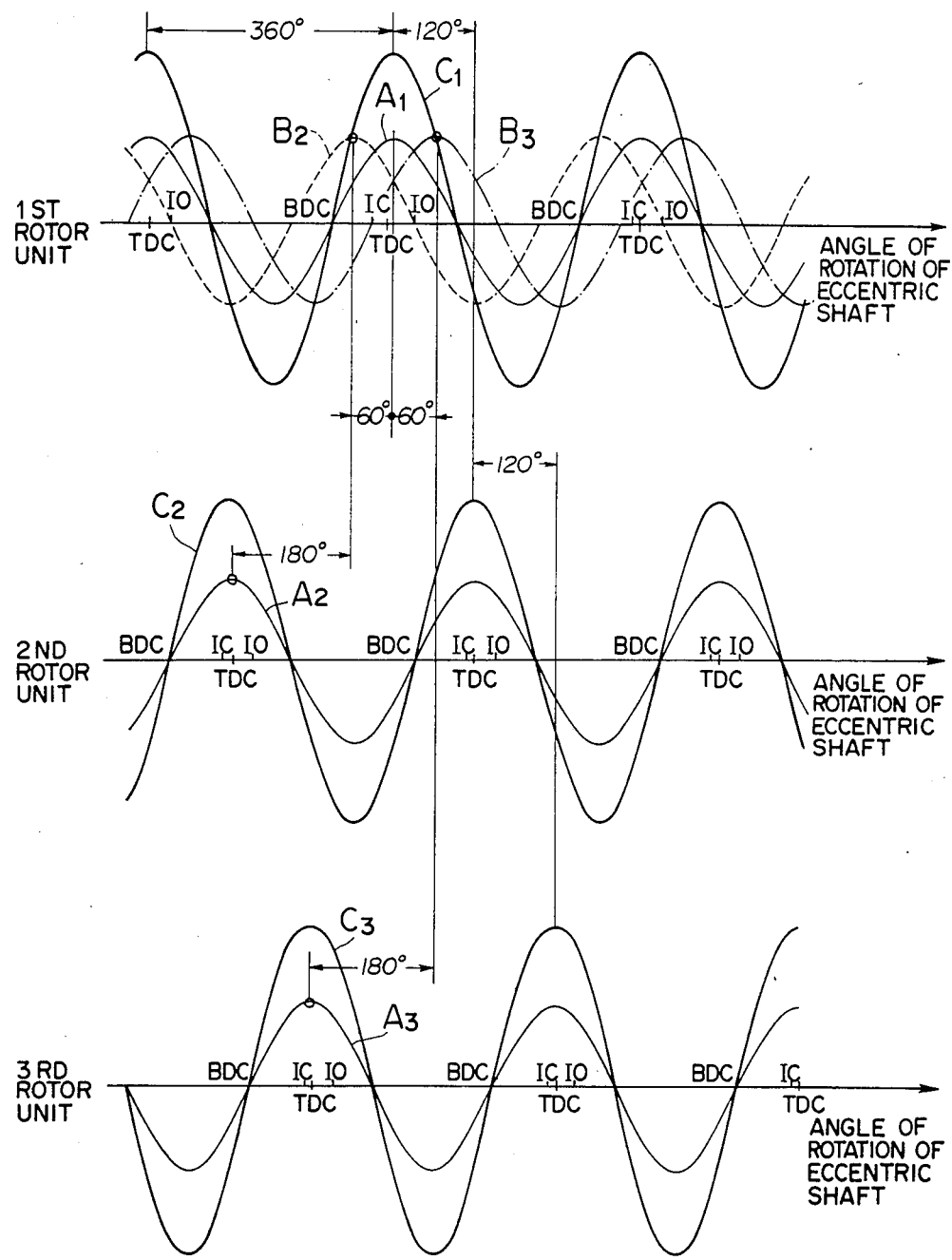
FIG. 3 is a diagram showing the pressure changes at respective intake ports.

Referring now to FIG. 3, there are shown intake port timings and the pressure changes in the respective rotor units 1a, 1b and 1c. As shown in FIG. 3, the intake port opens to one working chamber immediately after the top dead center TDC at a timing IO and closes after the bottom dead center BDC at a timing IC. In one rotor unit, immediately after one working chamber is disconnected from the intake port, the intake port is opened to a succeeding working chamber to start a next intake stroke. In the cyclic operation of the engine, there are produced basic pressure changes in the intake ports of the respective rotor units as shown by thin solid lines $A_1$, $A_2$ and $A_3$. As shown, the pressure in the working chamber decreases towards the intermediate period of the intake stroke and then starts to increase since the intake air flow rushes into the working chamber. Since the intake air continues to flow into the working chamber even after the bottom dead center, the intake air pressure continues to increase until a certain time after the intake port closes. The pressure of residual combustion gas assists the pressure rise. It will therefore be understood that the intake air pressure shows a peak value between the end of the intake stroke and the beginning of the intake stroke for the succeeding working chamber. The intake pressure thus changes substantially along a sine curve as shown by the lines $A_1$, $A_2$ or $A_3$. The pressure changes in the respective rotor units 1a, 1b and 1c are of 120° C. with each other in terms of rotating angle of the eccentric shaft.

In case where the pressure wave is transmitted from one rotor unit to another after a time interval corresponding to 180° in terms of the eccentric shaft rotation, the pressure wave transmitted from the rotor unit 1b to the rotor unit 1a is advanced in phase by 60° than the pressure wave produced in the rotor unit 1a at the intake port of the rotor unit 1a as shown by a broken line $B_2$. Similarly, the pressure wave transmitted from the rotor unit 1c to the rotor unit 1a is retarded in phase by 60° than the pressure wave produced in the rotor unit 1a at the intake port of the rotor unit 1a as shown by a chain line $B_3$. The pressure waves $B_2$ and $B_3$ transmitted from the rotor units 1b and 1c are added to the pressure wave $A_1$ produced in the rotor unit 1a and forms a pressure wave $C_1$. Similarly, pressure waves $C_2$ and $C_3$ are formed in the rotor units 1b and 1c in the vicinity of the intake ports. The pressure waves $C_1$, $C_2$ and $C_3$ thus amplified function to produce supercharging effects in the respective rotor units. It will therefore be understood that by determining the passage lengths 1 to meet the requirements in the formula (2) under a specific engine speed, it becomes possible to obtain supercharging effects at or in the vicinity of the engine speed. It should be noted herein that the intake passage lengths in conventional engines are much shorter than the value proposed by the present invention so that it is impossible to obtain the supercharging effects.

Figure 4:
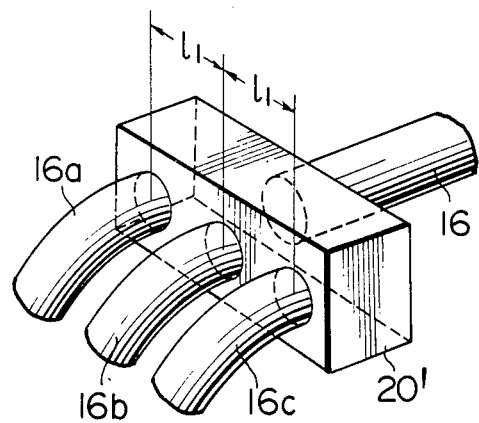
FIG. 4 is a diagrammatical perspective view showing one example of the intake manifold.
Figure 5:
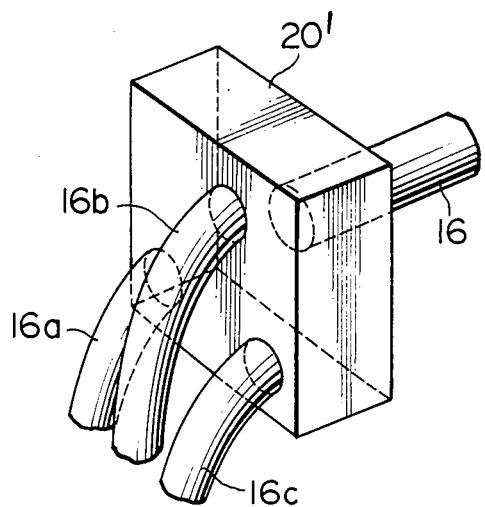
FIG. 5 is a perspective view similar to FIG. 4 but showing another example; and, FIG. 6 is a diagram showing the pressure changes in a four rotor type rotary piston engine.

In the structure shown in FIGS. 1 and 2, the individual intake passages are simply connected together at the junctions, however, from the view point of practical manufacture, a manifold tank 20' may be provided in the place of the junction 20 as shown in FIG. 4. The tank 20' should be of a volume which is small enough so that the pressure propagation is not disturbed. In the structure shown in FIG. 4, the individual intake passages 16a, 16b and 16c are arranged in a line and spaced apart by a distance $l_1$ so that there may be a certain difference in the distance of the pressure propagating passage, however, the difference can be made very small so that there will be no practical problem. The arrangement shown in FIG. 5 is different from the arrangement in FIG. 4 in that the individual intake passages 16a, 16b and 16c are connected with the manifold tank 20' at equi-distant positions.

Figure 6:
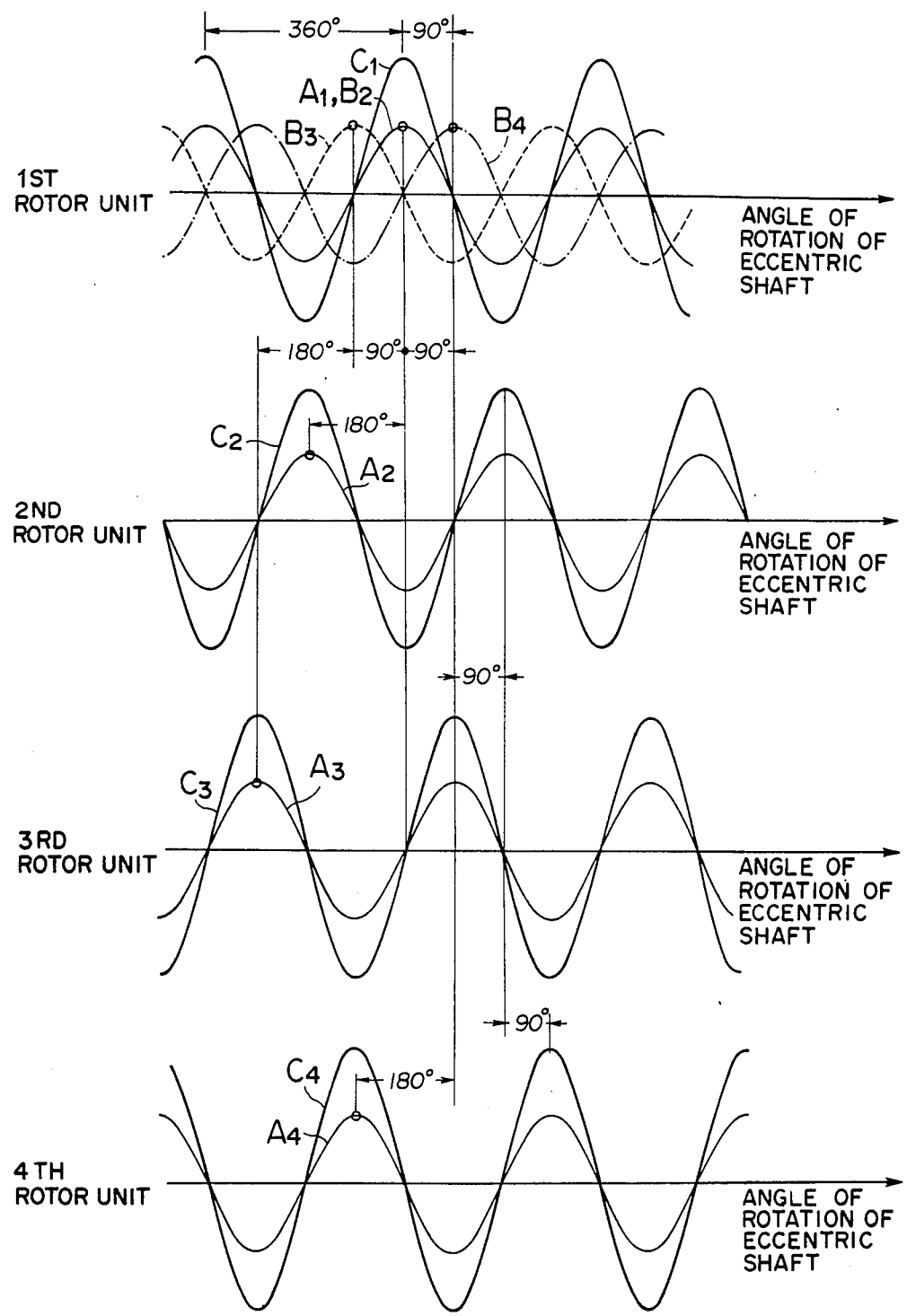

In case of a four rotor type rotary piston engine, the rotors are disposed with 90° phase difference. The pressure waves produced in such four rotor type rotary engine are shown in FIG. 6. In this example, ignition takes place in the order of the first, the third, the second and the fourth rotor units and the pressure waves $A_1$, $A_2$, $A_3$ and $A_4$ as produced in the respective rotor units have 90° phase difference. The pressure wave in one rotor unit is tramsitted to other rotor units to produce combined pressure waves $C_1$, $C_2$, $C_3$ and $C_4$.

Combined pressure waves as obtained in a rotary piston engine having three or more rotors can be calculated in a general form as follows provided that the intake passage lengths are determined so that the pressure wave as produced in one rotor unit is transmitted to another with a 180° phase difference. Assuming that the number of the rotor units is n and the rotors in the respective rotor units are disposed with the same phase difference, the basic pressure waves Pn can be represented by the following formulae.

$$P_1 = \cos A$$

$$P_2 = \cos(A + 360/n + 180)$$

$$P_n = \cos(A + 360(n-1)/n + 180)$$

Thus, the combined pressure wave P can be represented by the following formula.

$$P(A) = \cos A + \cos(A + 360/n + 180) + \ldots + \cos(A + 360(n-1)/n + 180) = 2\cos A$$

It will therefore be understood that the combined pressure wave I in principle two times as large as the basic pressure wave as produced in each of the rotor units. Thus, it should be appreciated that the concept of the present invention is applicable not only to rotary piston engines having three and four rotors but to any rotary piston engines having three or more rotors.

The invention has thus been shown and described with reference to specific embodiments, however, it should be noted that the invention is in no way limited to the details of the illustrated structures but changes and modifications may be made without departing from the scope of the appended claims.

What is claimed is:

1. A rotary piston engine comprising a rotor casing which includes at least three rotor housings each having an inner wall surface of a trochoidal configuration, an intermediate housing located between each adjacent two rotor housings and a side housing attached to an outer surface of each outermost rotor housing so that a rotor cavity of trochoidal configuration is defined in each rotor housing, a substantially polygonal rotor disposed in each rotor cavity with apex portions in sliding contact with the inner wall surface of the rotor housing to define working chambers of cyclically variable volumes upon rotation of the rotor, eccentric shaft means carrying said rotors so that the rotors are angularly offset with each other by equal angular distance, intake means including intake port means provided in said casing to open the rotor cavity in each rotor housing, individual intake passage means having one end connected with each intake port means, junction means connected with the other ends of the respective individual passage means, said individual intake passage means leading to the respective ones of the intake passage means having the same passage length, said individual intake passage means and said junction means having passage lengths which are determined such that a pressure wave produced at one intake port means is transmitted to another intake port means after a time interval corresponding to 180° in terms of angle of rotation of the eccentric shaft means in a normal speed range of engine operation.

2. A rotary piston engine in accordance with claim 1 which has three rotors and the eccentric shaft means carries the rotors with 120° phase difference.

3. A rotary piston engine in accordance with claim 2 in which each of said individual intake passage means has a length between 0.65 and 1.04 m so that a supercharging effect can be obtained in an engine speed range between 5000 and 8000 rpm.

4. A rotary piston engine in accordance with claim 2 in which said junction means includes chamber means.

5. A rotary piston engine in accordance with claim 4 in which said other ends of the individual intake passage means are connected with said chamber means at positions aligned in a straight line.

6. A rotary piston engine in accordance with claim 4 in which said other ends of the individual intake passage means are connected with the chamber means at positions arranged in a triangle.

7. A rotary piston engine in accordance with claim 1 which includes four rotors and said eccentric shaft means carries said rotors with 90° phase difference.

8. A rotary piston engine in accordance with claim 7 in which each of said individual intake passage means has a length between 0.65 and 1.04 m so that a supercharging effect can be obtained in an engine speed range between 5000 and 8000 rpm.

9. A rotary piston engine in accordance with claim 1 in which said intake means includes primary intake passage means which is used in at least light load engine operation and secondary intake passage means which is used in a heavy load engine operation, said secondary intake passage means including the individual intake passage means having said passage lengths.

10. A rotary piston engine comprising a rotor casing which includes at least three rotor housings each having an inner wall surface of a trochoidal configuration, an intermediate housing located between each adjacent two rotor housings and a side housing attached to an outer surface of each outermost rotor housing so that a rotor cavity of trochoidal configuration is defined in each rotor housing, a substantially polygonal rotor disposed in each rotor cavity with apex portions in sliding contact with the inner wall surface of the rotor housing to define working chambers of cyclically variable volumes upon rotation of the rotor, eccentric shaft means carrying said rotors so that the rotors are angularly offset with each other by equal angular distance, intake means including intake port means provided in said casing to open to the rotor cavity in each rotor housing, individual intake passage means having one end connected with each intake port means, junction means connected with the other ends of the respective individual passage means, said individual intake passage means leading to the respective ones of the intake port means having the same passage length, said individual intake passage means and said junction means having passage lengths which are determined such that a sonic propagation takes place through the passages from the intake port means for one rotor cavity to the intake port means for another rotor cavity in a time interval corresponding to 180° in terms of rotation of the eccentric shaft means.

11. A rotary piston engine in accordance with claim 10 in which each of said individual intake passage means has a length between 0.65 and 1.04 m so that a supercharging effect can be obtained in an engine speed range between 5000 and 8000 rpm.

12. A rotary piston engine in accordance with claim 10 which has three rotors and the eccentric shaft means carries the rotors with 120° phase difference.

13. A rotary piston engine in accordance with claim 12 in which said intake means includes primary intake passage means which is used in at least light load engine operation and secondary intake passage means which is used in a heavy load engine operation, said secondary intake passage means including the individual intake passage means having said passage lengths.

* * * * *